United States Patent
Smook

(10) Patent No.: US 8,702,558 B2
(45) Date of Patent: Apr. 22, 2014

(54) PLANETARY GEAR TRANSMISSION UNIT

(75) Inventor: Warren Smook, Huldenberg (BE)

(73) Assignee: Hansen Transmissions International N.V., Kontich (BE)

( * ) Notice: Subject to any disclaimer, the term of this patent is extended or adjusted under 35 U.S.C. 154(b) by 0 days.

(21) Appl. No.: 12/782,755

(22) Filed: May 19, 2010

(65) Prior Publication Data

US 2010/0296934 A1    Nov. 25, 2010

(30) Foreign Application Priority Data

May 20, 2009   (GB) .................................. 0908778.4

(51) Int. Cl.
*F16H 57/08*    (2006.01)

(52) U.S. Cl.
USPC ............ 475/346; 475/331; 475/347; 475/348

(58) Field of Classification Search
USPC .................. 475/331, 346, 347, 348
See application file for complete search history.

(56) References Cited

U.S. PATENT DOCUMENTS

| | | | | |
|---|---|---|---|---|
| 3,352,178 A | * | 11/1967 | Lindgren et al. | 475/347 |
| 6,402,654 B1 | * | 6/2002 | Lanzon et al. | 475/204 |
| 7,297,086 B2 | * | 11/2007 | Fox | 475/331 |
| 2008/0194378 A1 | * | 8/2008 | Fox | 475/347 |
| 2008/0274849 A1 | * | 11/2008 | Smook et al. | 475/11 |

FOREIGN PATENT DOCUMENTS

| | | |
|---|---|---|
| GB | 1 101 131 A | 1/1968 |
| WO | 2005/050058 A1 | 6/2005 |

* cited by examiner

*Primary Examiner* — Derek D Knight
(74) *Attorney, Agent, or Firm* — Young & Thompson

(57) ABSTRACT

A planetary gear transmission unit (10) includes a ring gear (17), a sun gear (18) and a planet carrier (19) driving a plurality of planet shafts (12) onto which planet gears (11) are rotatably mounted by way of planet bearings (13). The planet shafts are flexpin shafts (12) and each flexpin shaft (12) includes a pair of planet gears (11), each planet gear (11) of the pair being of the single helical type having a helix angle opposite to that of the other planet gear (11) of the pair. A gearbox (20) including a planetary gear transmission unit (10) according to embodiments of the invention and a wind turbine including such a gearbox (20) are also described.

16 Claims, 4 Drawing Sheets

PLANETARY GEAR TRANSMISSION UNIT

TECHNICAL FIELD OF THE INVENTION

The present invention relates to a planetary gear transmission unit, which may be used in a gearbox for a wind turbine.

BACKGROUND OF THE INVENTION

For planetary gear transmission units upon which extremely high demands are made and which are subjected to very high loads, such as planetary gear transmission units for wind turbines for example, gears with helical teeth are usually used, since gears with helical teeth possess better characteristics both for achieving a required nominal capacity and a reduction of sound and vibration.

Some kinds of such planetary gear transmission units with helical teeth are already known. However, they still have major problems and could still be optimised considerably.

When designing a planetary gear transmission unit, a selection has to be made regarding the helix angle of the gear teeth and the dimensions to be used for the ring gear, sun gear and the planet gears, in order to be capable of taking the required load and to achieve the correct gear ratio.

In order to be capable of withstanding higher loads, it may be possible to extend the dimensions of the entire gear transmission unit, which should, however, be limited as far as possible, of course, for economic and logistic reasons.

Only a proper combination of all possible factors may result in the creation of a gear transmission unit that can take higher loads while having relatively small dimensions, at least in comparison with existing planetary gear transmission units.

For example, in case of bearings for supporting planet gears in the planetary gear transmission unit, there are a number of restrictions when selecting such planet bearings with larger radial dimensions, as the gear rim of these planet gears must have a certain thickness to avoid negative interactions between the teeth of the planet gears and the outer bearing ring of the planet bearing, or simply to withstand the loads or to ensure a certain minimum lifespan for the bearing.

Along the axial direction, the required gear capacity imposes a minimum value on the gear width, and sufficient gear width is also necessary in order to be capable of taking the torques on the planet gears by means of a bearing, or to achieve proper axial and radial bearing support for the planet gears. The helix angle of the gear teeth affects the planet bearing, since gears with helical teeth are inclined to axially move away from each other. The larger the helix angle of the teeth, the larger the axial forces between the teeth will be. A planetary gear transmission unit has this tendency for the gears to axially move apart, both between the ring gear and the planet gears, and between the planet gears and the sun gear.

The axial force to which a planet gear is subjected in relation to the ring gear is opposite to the axial force exerted by the sun gear on the planet gear. These axial forces therefore cancel each other out, as a result of which there is no net axial force seen at the planet shafts and the planet bearing, so that this does not affect the planet bearing.

A known solution for making the planetary gear transmission unit to withstand high loads is to use flexpin shafts as planet shafts. Such flexpin shafts are known from, for example, GB 1,101,131.

FIG. 1 illustrates the principle of a flexpin shaft. FIG. 1 shows a planet gear 1 which is mounted on a flexpin shaft 2 by means of bearing 3. Exerting a force F on the planet gear 1 causes a moment A on one side of the flexpin shaft 2 and a moment B on the other side of the flexpin shaft 2, moments A and B having opposite directions. This causes angular deformation of the flexpin shaft 2 as illustrated at the right side of FIG. 1. This angular deformation on both sides of the flexpin shaft 2 should be equal.

However, such a flexpin shaft is not suitable to be used in combination with gears having helical teeth. This is because in case of helical teeth, the opposite axial forces (see arrows with reference number 6 in FIG. 2) which were described above, are exerted at the ring gear and sun gear respectively. Therefore, each planet gear is subjected to tilted moments which have to be handled by the planet bearing. Hence, when using helical teeth in a planetary gear transmission unit, a moment is created by the axial components of the normal tooth forces in the ring gear and sun gear meshes respectively. This causes the planet gears 1 to skew. With a flexpin design the planet shaft assembly is less stiff than in conventional designs and will thus cause more planet skewing. This may be solved by making the flexpin shaft 2 anisotropic as far as its stiffness goes. This is illustrated in FIG. 3, where the flexpin shaft 2 is designed to have a part 4 with lower stiffness than the part 5. In that way, flexibility in the tangential direction is still allowed while the flexpin shaft is as stiff as possible in a plane normal to the tangential direction. In this way, it could become possible to use the flexpin in combination with helical teeth.

However, the above described solution is complex and therefore increases the cost and manufacturing time of planetary gear transmission units comprising such flexpin design.

Therefore, there is a need for a design of a planetary gear transmission unit in which the planet gears have helical teeth and which are able to withstand high loads.

SUMMARY OF THE INVENTION

It is an object of embodiments of the present invention to provide a planetary gear transmission unit that can withstand high loads, to a gearbox comprising such a planetary gear transmission unit and to a wind turbine comprising such a gearbox.

The above objective is accomplished by device according to embodiments of the present invention.

In a first aspect of the invention, a planetary gear transmission unit is provided. The planetary gear transmission unit comprises a ring gear, a sun gear and a planet carrier driving a plurality of planet shafts onto which planet gears are rotatably mounted by means of planet bearings, wherein the planet shafts are flexpin shafts, also referred to as flexpins, each flexpin shaft comprising a pair of planet gears, each planet gear of the pair being of the single helical type and of a helix angle opposite to that of the other planet gear of the pair, which may also be referred to as teeth of the chevron type.

The inventive aspect of the invention lies in the fact that the invention allows to use of gears having single helical teeth, which is advantageous with respect to the use of straight teeth, in a planetary gear transmission unit while making sure that this planetary gear transmission unit is able to withstand high loads. In a planetary gear transmission unit according to embodiments of the invention the load distribution over the planet gears is optimal and is lined out over the teeth of the gears.

Furthermore, a planetary gear transmission unit according to embodiments of the invention is easy to mount.

Moreover, for the design of the planetary gear transmission unit according to embodiments of the present invention, conventional, isotropic flexpin shaft may be used.

According to embodiments of the invention, the planet bearings may be double-row tapered roller bearings.

The outermost bearing ring of each double-row tapered roller bearing may be integrated in the planet gear concerned.

According to specific embodiments of the invention, the rows of tapered roller bearings of each double-row tapered roller bearing may bee arranged in 0-configuration.

According to further embodiments of the invention, the planet bearings may be double-row cylindrical roller bearings.

The outermost bearing ring of each double-row cylindrical roller bearing may be integrated in the planet gear concerned.

According to embodiments of the invention, the ring gear may be of a unitary type.

According to further embodiments of the invention, the sun gear is of a unitary type.

In a second aspect, the present invention provides a gearbox comprising at least one planetary gear transmission unit, the at least one planetary gear transmission unit comprising a ring gear, a sun gear and a planet carrier driving a plurality of planet shafts onto which planet gears are rotatably mounted by means of planet bearings, wherein the planet shafts are flexpin shafts, also referred to as flexpins, each flexpin shaft comprising a pair of planet gears, each planet gear of the pair being of the single helical type and of a helix angle opposite to that of the other planet gear of the pair.

The planetary gear transmission unit in the gearbox may be implemented according to any of the embodiments of the first aspect of the invention.

In still a further aspect, the present invention provides a wind turbine comprising a gearbox according embodiments of the present invention. In this aspect of the invention, the planetary gear transmission unit in the gearbox may also be implemented according to any of the embodiments of the first aspect of the invention.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In the different figures same reference signs refer to same or analogous elements.

DESCRIPTION OF ILLUSTRATIVE EMBODIMENTS

Figure 1:
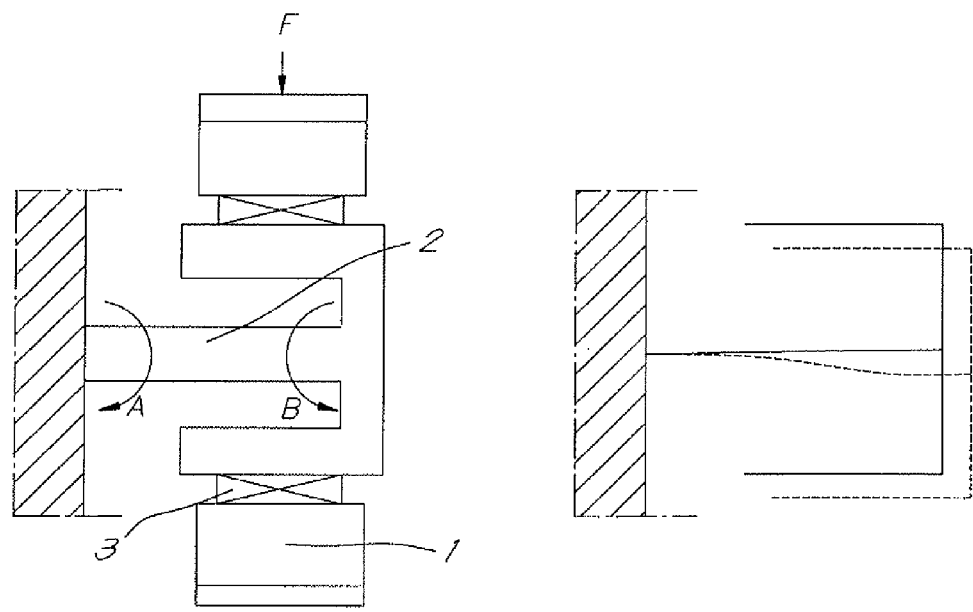
FIG. 1 to FIG. 3 illustrate the principle of the use of a flexpin shaft known in the prior art.
Figure 2:
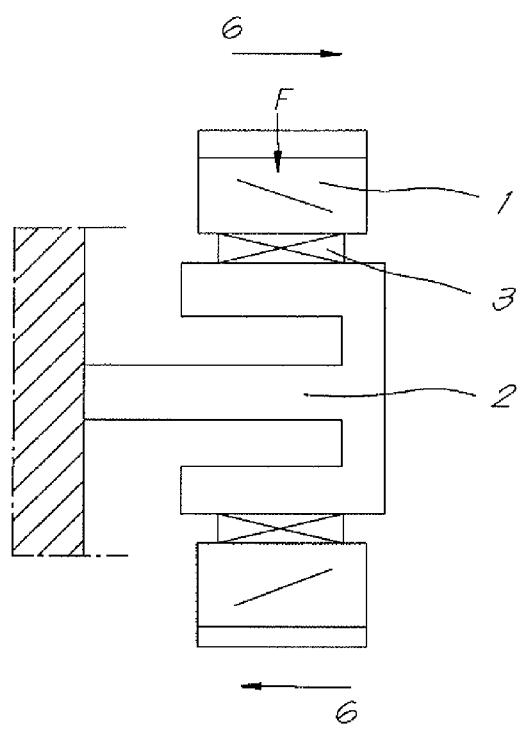
Figure 3:
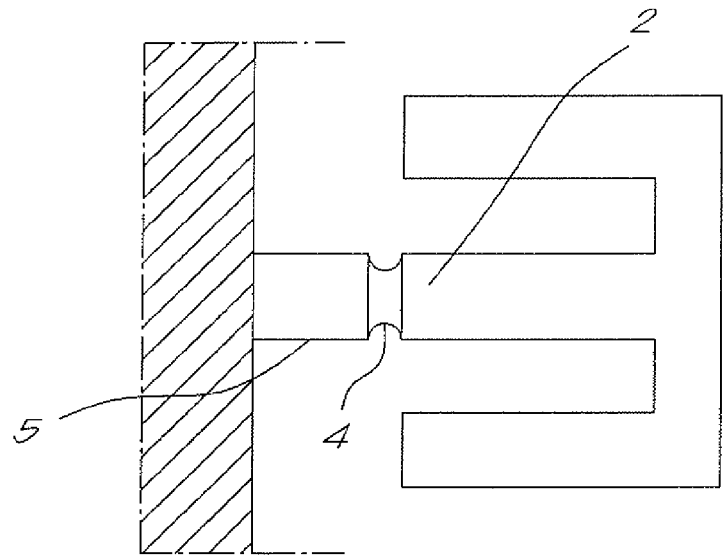

The present invention will be described with respect to particular embodiments and with reference to certain non-limiting drawings. It has to be understood that the invention is not limited thereto but is only limited by the claims. For illustrative purposes, the size of some of the elements in the drawings may be exaggerated and not drawn on scale.

Terms such as "comprising" and "coupled" are not to be interpreted as limiting the invention in any way. The term "comprising", used in the claims, should not be interpreted as being restricted to the means listed thereafter; it does not exclude other elements or steps. Similarly, it is to be noticed that the term "coupled", also used in the claims, should not be interpreted as being restricted to direct connections only.

While some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Hereinafter, the present invention will be described by means of different embodiments. It has to be understood that these embodiments are only for the ease of understanding the invention and are not intended to limit the invention in any way.

The present invention provides a planetary gear transmission unit comprising planet gears having helical teeth and being able to withstand high loads, a gearbox comprising such a planetary gear transmission unit and a wind turbine comprising such a gearbox.

In a first aspect, the present invention provides a planetary gear transmission unit. The planetary gear transmission unit comprises a ring gear, a sun gear and a planet carrier driving a plurality of planet shafts onto which planet gears are rotatably mounted by means of planet bearings. The planet shafts are flexpin shafts, which may also be referred to as flexpins, each flexpin shaft comprising a pair of planet gears, each planet gear of the pair being of the single helical type and of a helix angle opposite to that of the other planet gear of the pair.

Figure 4:
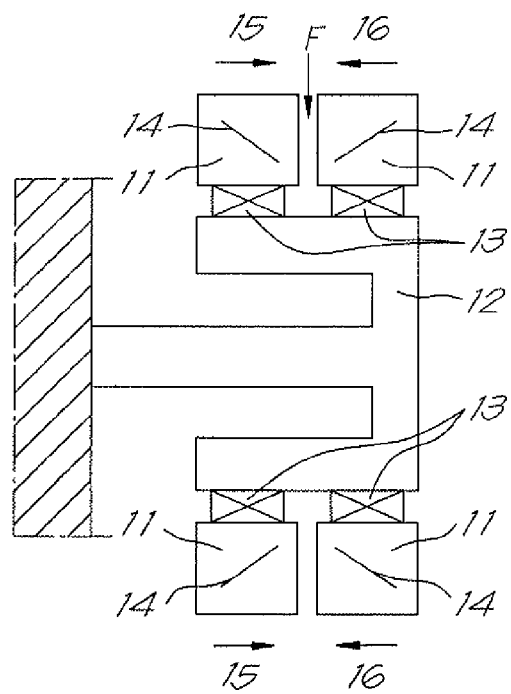
FIG. 4 illustrates the principle of a planetary gear transmission unit according to an embodiment of the invention.

FIG. 4 illustrates a part of a planetary gear transmission unit 10 according to an embodiment of the invention. A pair of planet gears 11 is mounted on a flexpin shaft 12 by means of bearings 13. The planet gears 11 of a pair are thus mounted on a same flexpin shaft 12 and are located directly next to each other. With 'directly next to each other' is meant that no other parts are located in between the two planet gears 11, such as for example means for driving the planet shafts, according to the present invention flexpin shafts 12, (e.g. back plate, bogie plate) which is the case in prior art designs (for example in WO 2005/050058). Each of the planet gears 11 have helical teeth (indicated by lines 14). As can be seen from the figure, the gears of a pair of gears 11 have helical teeth with opposite helix angle. This may also be referred to as teeth of the chevron type.

As already discussed above, gears with helical teeth cause axial forces acting on the ring gear and the sun gear and causing the planet gears to be subjected to tilted moments. According to embodiments of the present invention, the opposite angle of the helical teeth of planet gears 11 of a pair of planet gears 11 causes the axially induced tooth forces to be cancelled out (axial forces indicated by respectively reference numbers 15 and 16). The only resulting force is the force F, which causes an angular deformation of the flexpin shaft 12 as already discussed above and as illustrated in FIG. 1. Because of this angular deformation, when the planetary gear transmission unit 10 is loaded, the bearings 13 move in a direction parallel to and do not make an angle with other components of the planetary gear transmission unit 10.

The inventive aspect of the invention lies in the fact that the invention allows to use of gears having single helical teeth, which is advantageous with respect to the use of straight teeth, in a planetary gear transmission unit 10 while making sure that this planetary gear transmission unit 10 is able to withstand high loads.

In a planetary gear transmission unit 10 according to embodiments of the invention the load distribution over the planet gears 11 is optimal and is lined out over the teeth of the gears.

Furthermore, for the design of the planetary gear transmission unit 10 according to embodiments of the present invention, conventional, isotropic flexpin shafts may be used. Hence, a planetary gear transmission unit 10 having a flexpin/planet gear combination as described according to embodiments of the invention does not add additional complexity to the design of the planetary gear unit 10 and thus does not require additional costs for the implementation.

Another advantage of embodiments of the invention is that it allows to build the planetary gear transmission unit more compact. As planet gears can be put next to each other, they can be made smaller than in conventional designs. Because of the inventive design, this compact building can be done without having disadvantageous effects coming from the use of a flexpin shaft in combination with gears having helical teeth. Moreover, because of the helical teeth, a much higher rating can be obtained than when straight teeth are used. Hence, the design according to embodiments of the invention combines the advantages of helical teeth (rating) and smaller planet gears, and does not suffer from disadvantages coming from the use of a combination of gears having helical teeth and flexpin shafts.

A planetary gear transmission unit 10 according to embodiments of the invention is easy to mount. For example, first a first planet gear 11 of the pair of planet gears 11 is mounted onto the flexpin 12, then the ring gear is mounted and in a next step the second planet gear 11 of the pair of planet gears 11 is mounted onto the flexpin 12. The pair of planet gears 11 can be locked by means of, for example, a collar at one side of the planetary gear transmission unit 10 and a shaft nut and the other side of the planetary gear transmission unit 10. Hence, the design according to embodiments of the present invention allows for the ring gear and the sun gear in the planetary gear transmission unit 10 to be of the unitary type which is a big advantage with respect to costs.

According to embodiments of the invention, the planet bearings 13 may be double-row tapered roller bearings. In some embodiments, the outermost bearing ring of each double-row tapered roller bearing may be integrated in the planet gear 11 concerned. The rows of tapered roller bearings of each double-row tapered roller bearing may, for example, be arranged in 0-configuration.

According to further embodiments, the planet bearings may be double-row cylindrical roller bearings. According to some embodiments, the outermost bearing ring of each double-row cylindrical roller bearing may be integrated in the planet gear concerned.

According to embodiments of the invention, the inner rings of the planet bearings 13 of each planet shaft, according to the present invention on each flexpin shat 12, may be in direct contact with each other or may be in contact with each other through one or more spacer bushes.

Figure 5:
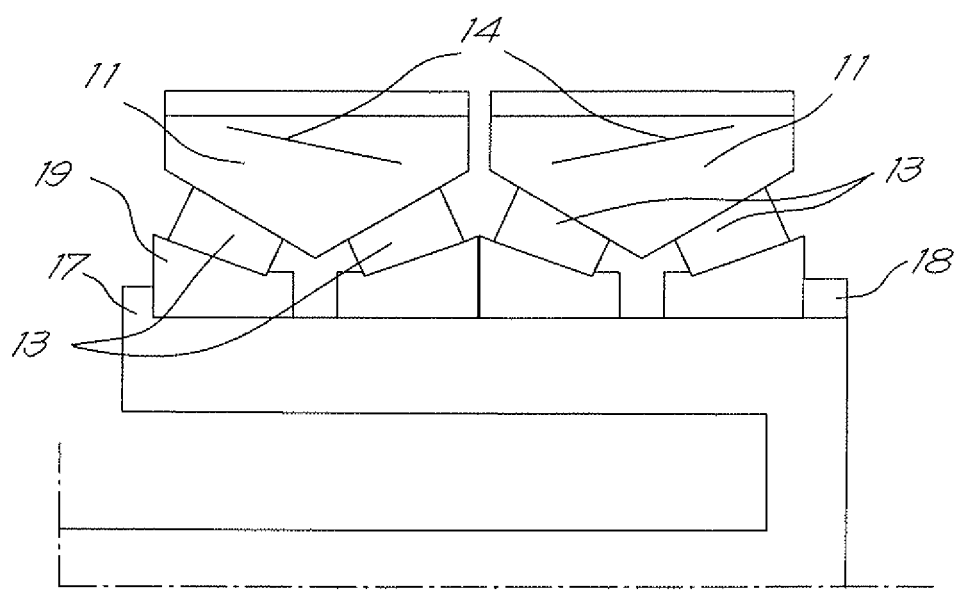
FIG. 5 schematically illustrates a planetary gear transmission unit according to an embodiment of the invention.

FIG. 5 illustrates a possible implementation of a planetary gear transmission unit 10 according to an embodiment of the invention. It has to be understood that this is only for the ease of explanation and that this is not intended to limit the invention in any way. The planetary gear transmission unit 10 illustrated in FIG. 5 comprises pairs of planets 11 mounted on a flexpin shaft 12 by means of planet bearings 13. Each planet gear 11 of the pair of planet gears 11 is of the single helical type and has a helix angle opposite to that of the other planet gear 11 of the pair, also referred to as teeth of the chevron type.

In the example given, the planet bearings 13 may be double-row tapered roller bearings. More particularly, according to the present example, the tapered roller bearing may have an integrated outer ring, i.e. outermost bearing ring of each tapered roller bearing may be integrated in the planet gear 11 concerned. The tapered bearing rollers of each planet gear 11 may, according to the present example, be arranged in a so-called O-configuration.

In the example given in FIG. 5 the planet gears 11 and their bearings 13 may be locked by means of a collar 17 at one side of the planetary gear transmission unit 10 and a shaft nut 18 at the other side of the planetary gear transmission unit 10.

Figure 6:
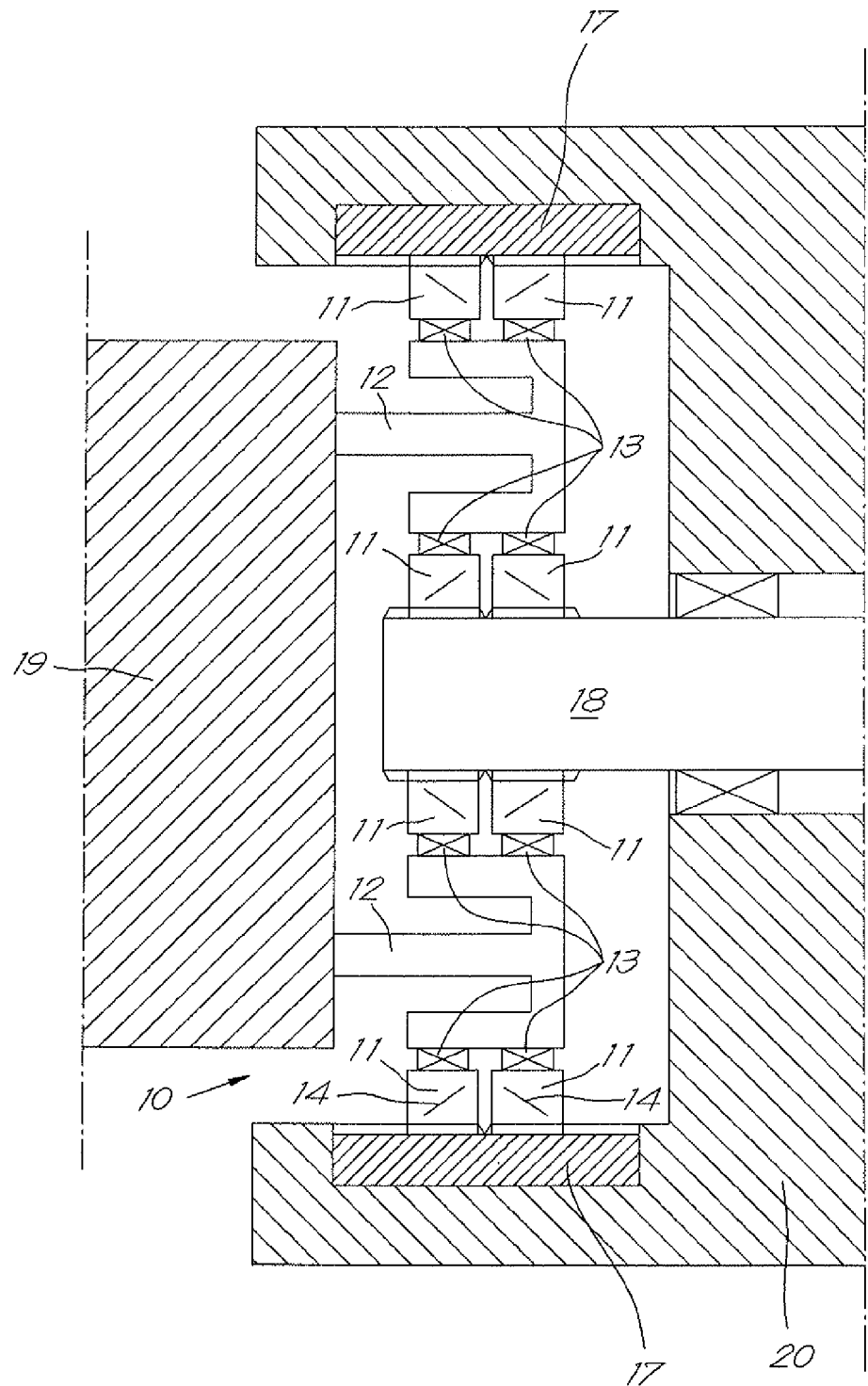
FIG. 6 illustrates a gearbox according to an embodiment of the present invention.

In a second aspect, the present invention provides a gearbox 20 comprising at least one planetary gear transmission unit 10. This is illustrated in FIG. 6. The planetary gear transmission unit 10 comprises a ring gear 17, a sun gear 18 and a planet carrier 19 driving a plurality of planet shafts 12 onto which planet gears 11 are rotatably mounted by means of planet bearings 13. The planet shafts are flexpins 12, each flexpin 12 comprising a pair of planet gears 11, each planet gear 11 of the pair being of the single helical type and of a helix angle opposite to that of the other planet gear of the pair. This may also be referred to as teeth of the chevron type. The gear transmission unit 10 may furthermore be implemented as described in the embodiments above for the first aspect of the invention. A design according to embodiments of the present invention allows for the ring gear 17 and the sun gear 18 in the planetary gear transmission unit 10 to be of the unitary type which is a big advantage with respect to costs.

According to a still further aspect, the present invention provides a wind turbine comprising a gearbox 20 according to embodiments of the invention. The gearbox 20 may comprise a planetary gear transmission unit 10 according to any of the embodiments described above for the first aspect of the invention.

The invention claimed is:

1. A planetary gear transmission unit (10) comprising:
   a ring gear (17), a sun gear (18) and a planet carrier (19) driving a plurality of planet shafts (12),
   the planet shafts being flexpin shafts (12),
   each flexpin shaft (12) comprising a pair of adjacent, spaced apart planet gears (11), each planet gear (11) free of contact with the other planet gear (11),
   each planet gear (11) of the pair being of the single helical type and of a helix angle opposite to that of the other planet gear (11) of the pair,
   wherein the planet gears (11) of the pair are located directly next to each other on the flexpin shaft (12).

2. The planetary gear unit transmission (10) according to claim 1, wherein the planet gears (11) are rotatably mounted by means of planet bearings (13) and the planet bearings (13) are double-row tapered roller bearings.

3. The planetary gear transmission unit (10) according to claim 2, wherein an outermost bearing ring of each double-row tapered roller bearing (13) is integrated in the planet gear (11) concerned.

4. The planetary gear transmission unit (10) according to claim 3, wherein the rows of tapered roller bearings of each double-row tapered roller bearing (13) are arranged in an 0-configuration.

5. The planetary gear transmission unit (10) according to claim 2, wherein the rows of tapered roller bearings of each double-row tapered roller bearing (13) are arranged in an 0-configuration.

6. The planetary gear transmission unit (10) according to claim 2, wherein the planet bearings (13) are double-row cylindrical roller bearings.

7. The planetary gear transmission unit (10) according to claim 6, wherein an outermost bearing ring of each double-row cylindrical roller bearing (13) is integrated in the planet gear (11) concerned.

8. The planetary gear transmission unit (10) according to claim 1, wherein the ring gear (17) is of a unitary type.

9. The planetary gear transmission unit (10) according to claim 1, wherein the sun gear (18) is of a unitary type.

10. The planetary gear transmission unit (10) according to claim 1, wherein the pair of adjacent, spaced apart planet gears (11) are immediately adjacent each other free of any intermediate element therebetween.

11. A gearbox (20) comprising:
at least one planetary gear transmission unit (10),
the at least one planetary gear transmission unit (10) comprising a ring gear (17), a sun gear (18) and a planet carrier (19) driving a plurality of planet shafts (12),
the planet shafts being flexpin shafts (12),
each flexpin shaft (12) comprising a pair of adjacent, spaced apart planet gears (11), each planet gear (11) free of contact with the other planet gear (11),
each planet gear (11) of the pair being of the single helical type and of a helix angle opposite to that of the other planet gear (11) of the pair,
wherein the planet gears (11) of the pair are located directly next to each other on the flexpin shaft (12).

12. A wind turbine comprising the gearbox (20) according to claim 11.

13. The gearbox according to claim 11, wherein the planet gears (11) are rotatably mounted by means of planet bearings (13).

14. The gearbox according to claim 11, wherein the pair of adjacent, spaced apart planet gears (11) are immediately adjacent each other free of any intermediate element therebetween.

15. A gearbox (20) comprising:
at least one planetary gear transmission unit (10);
the at least one planetary gear transmission unit (10) comprising a ring gear (17), a sun gear (18) and a planet carrier (19) driving a plurality of planet shafts (12), the planet shafts being flexpin shafts (12);
a first double-row tapered roller bearing (13) located adjacent a second double-row tapered roller bearing (13) on each planet shaft (12), the first and second double-row tapered roller bearings (13) being spaced apart and free of contact with each other;
a first planet gear (11) rotatably mounted on the first planet bearing (13) adjacent a second planet gear (11) rotatably mounted on the second planet bearing (13),
the first and second planet gears (11) being spaced apart and free of contact with each other,
each planet gear (11) of the first and second planet gears (11) being of the single helical type and of a helix angle opposite to that of the other planet gear (11).

16. The gearbox according to claim 15, wherein the first and second planet gears (11) are immediately adjacent each other free of any intermediate element therebetween.

\* \* \* \* \*